US009162591B2

(12) United States Patent
Tame et al.

(10) Patent No.: US 9,162,591 B2
(45) Date of Patent: Oct. 20, 2015

(54) POWER RETURN MECHANISM FOR SEAT BACK (71) Applicants: Omar Tame, West Bloomfield, MI (US); Louis Vetere, II, Commerce, MI (US)

(72) Inventors: Omar Tame, West Bloomfield, MI (US); Louis Vetere, II, Commerce, MI (US)

(73) Assignee: Magna Seating Inc., Aurora, Ontario (CA)

(*) Notice: Subject to any disclaimer, the term of this patent is extended or adjusted under 35 U.S.C. 154(b) by 163 days.

(21) Appl. No.: 13/928,412

(22) Filed: Jun. 27, 2013

(65) Prior Publication Data
US 2014/0001810 A1 Jan. 2, 2014

Related U.S. Application Data (60) Provisional application No. 61/665,578, filed on Jun. 28, 2012, provisional application No. 61/675,606, filed on Jul. 25, 2012.

(51) Int. Cl.
*B60N 2/20* (2006.01)
*B60N 2/23* (2006.01)
*B60N 2/02* (2006.01)

(52) U.S. Cl.
CPC ............... *B60N 2/20* (2013.01); *B60N 2/0232* (2013.01); *B60N 2002/024* (2013.01); *B60N 2002/0236* (2013.01)

(58) Field of Classification Search
CPC .......... B60N 2/20; B60N 2/3013; B60N 2/36; B60N 2/3011; B60N 2/0232; B60N 2002/0236; B60N 2002/024

USPC .......................................... 297/378.1, 362.11
See application file for complete search history.

(56) References Cited

U.S. PATENT DOCUMENTS

| 3,427,073 | A | 2/1969 | Downs et al. |
| 4,805,961 | A * | 2/1989 | Garrod ..................... 297/362.14 |
| 5,575,531 | A | 11/1996 | Gauger et al. |
| 6,547,332 | B2 | 4/2003 | Pejathaya |
| 7,100,985 | B2 | 9/2006 | Wagner et al. |
| 7,188,904 | B2 | 3/2007 | Bruck et al. |
| 7,726,742 | B2 | 6/2010 | Keyser et al. |
| 2010/0109388 | A1* | 5/2010 | Habedank et al. ............ 297/119 |
| 2010/0314920 | A1* | 12/2010 | Arata et al. ................ 297/217.3 |

FOREIGN PATENT DOCUMENTS

DE 102009027464 A1 * 1/2011

* cited by examiner

*Primary Examiner* — Milton Nelson, Jr.
(74) *Attorney, Agent, or Firm* — Miller Canfield (57) ABSTRACT A seat assembly having a seat cushion and a seat back pivotally coupled to the seat cushion for pivotal movement between a generally upright seating position and a folded position overlying the seat cushion. A power return mechanism is operatively coupled to the seat back for automatically returning the seat back from the folded position to the seating position. The power return mechanism includes a support bracket for mounting the power return mechanism to the seat assembly, a slider bracket slidably coupled to the support bracket, a cable connected between the seat back and the slider bracket, and a motor and gear assembly for power driving the slider bracket between a home position when the seat back is in the seating position and a full stroke position pulling the cable to pivot the seat back from the folded position to the seating position.

17 Claims, 8 Drawing Sheets

POWER RETURN MECHANISM FOR SEAT BACK

CROSS-REFERENCE TO RELATED APPLICATIONS

This application claims priority to and all the benefits of U.S. Provisional Application Nos. 61/665,578, filed on Jun. 28, 2012, and 61/675,606, filed on Jul. 25, 2012.

BACKGROUND OF THE INVENTION

1. Field of the Invention

The present invention relates to a seat assembly having a seat cushion and a seat back pivotally coupled to the seat cushion and operable between an upright seating position and a folded position overlying the seat cushion wherein a power return mechanism automatically returns the seat back from the folded position to the seating position.

2. Description of Related Art

Seat assemblies for automotive vehicles include a generally horizontal seat cushion fixedly secured to the floor of the vehicle and a seat back pivotally coupled to the seat cushion. It is commonly known and desirable for the seat back of the seat assembly to be pivotal between a generally upright seating position and a folded position overlying the seat cushion to provide additional storage capacity in the vehicle. A recliner assembly pivotally couples the seat back to the seat cushion to lock and unlock the seat back in each of the seating and folded positions. The seat back may be manually pivoted by a vehicle seat occupant between the seating and folded positions or alternatively the seat back may be automatically power driven by a motor between the seating and folded positions.

It is desirable to provide a simple power return mechanism coupled to the seat back for automatically returning the seat back from the folded position to the seating position. It is also desirable to provide a power return mechanism which may also control the descent of the seat back from the seating position to the folded position.

SUMMARY OF THE INVENTION

According to one embodiment of the present invention, a seat assembly is provided for use in an automotive vehicle. The seat assembly comprises a seat cushion and a seat back pivotally coupled to the seat cushion for pivotal movement between a generally upright seating position and a folded position overlying the seat cushion. A power return mechanism is operatively coupled to the seat back for automatically returning the seat back from the folded position to the seating position. The power return mechanism includes a support bracket for mounting the power return mechanism to the seat assembly, a slider bracket slidably coupled to the support bracket, a cable having a first end connected to the seat back and an opposite second end connected to the slider bracket, and a motor and gear assembly for power driving the slider bracket between a home position when the seat back is in the seating position and a full stroke position pulling the cable to pivot the seat back from the folded position to the seating position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Referring to Figures, a seat assembly for use in an automotive vehicle according to a first embodiment of the invention is shown at 10. The seat assembly 10 includes a generally horizontal seat cushion 12 and a generally upright seat back 14. The seat assembly 10 includes an upper A bracket 16 for supporting the seat back 14 and a lower B bracket 18 for supporting the seat cushion 12 and the A bracket 16. A cross support rod 20 extends between spaced apart B brackets 18 for further supporting the seat cushion 12. The seat back 14 is pivotally coupled to the upper A bracket 16 by a recliner assembly 22, such as a disc recliner as is commonly known in the art, for selectively locking the seat back 14 in one of a plurality of generally upright or reclined seating positions and unlocking the seat back 14 for pivotal movement between the seating position and a folded position overlying the seat cushion 12.

Referring to FIGS. 1-4, according to a first embodiment of the invention, the seat assembly 10 includes a power return mechanism generally shown at 30 operatively coupled to the seat back 14 for automatically returning the seat back 14 from the folded position to the seating position. The power return mechanism 30 includes a generally L-shaped support bracket 32 having a base portion 34 fixedly secured to the B bracket 18 for mounting the power return mechanism 30 to the seat assembly 10 and a slide portion 36 extending generally perpendicular from the base portion 34 to a distal end 38 adjacent the recliner assembly 22. The power return mechanism 30 further includes a powered motor and gear assembly 40 fixedly mounted to the base portion 34. The motor and gear assembly 40 comprises an electric motor 42 electrically connected to a power source, such as a battery, within the vehicle. A gear train 44 is operatively coupled to the electric motor 42. A threaded drive screw 46 is connected to the gear train and extends longitudinally through a bore 48 in the base portion 34 to a free distal end 50. The electric motor 42 and gear train 44 selectively drive the drive screw 46 in the clockwise and counterclockwise rotational directions.

Figure 4:
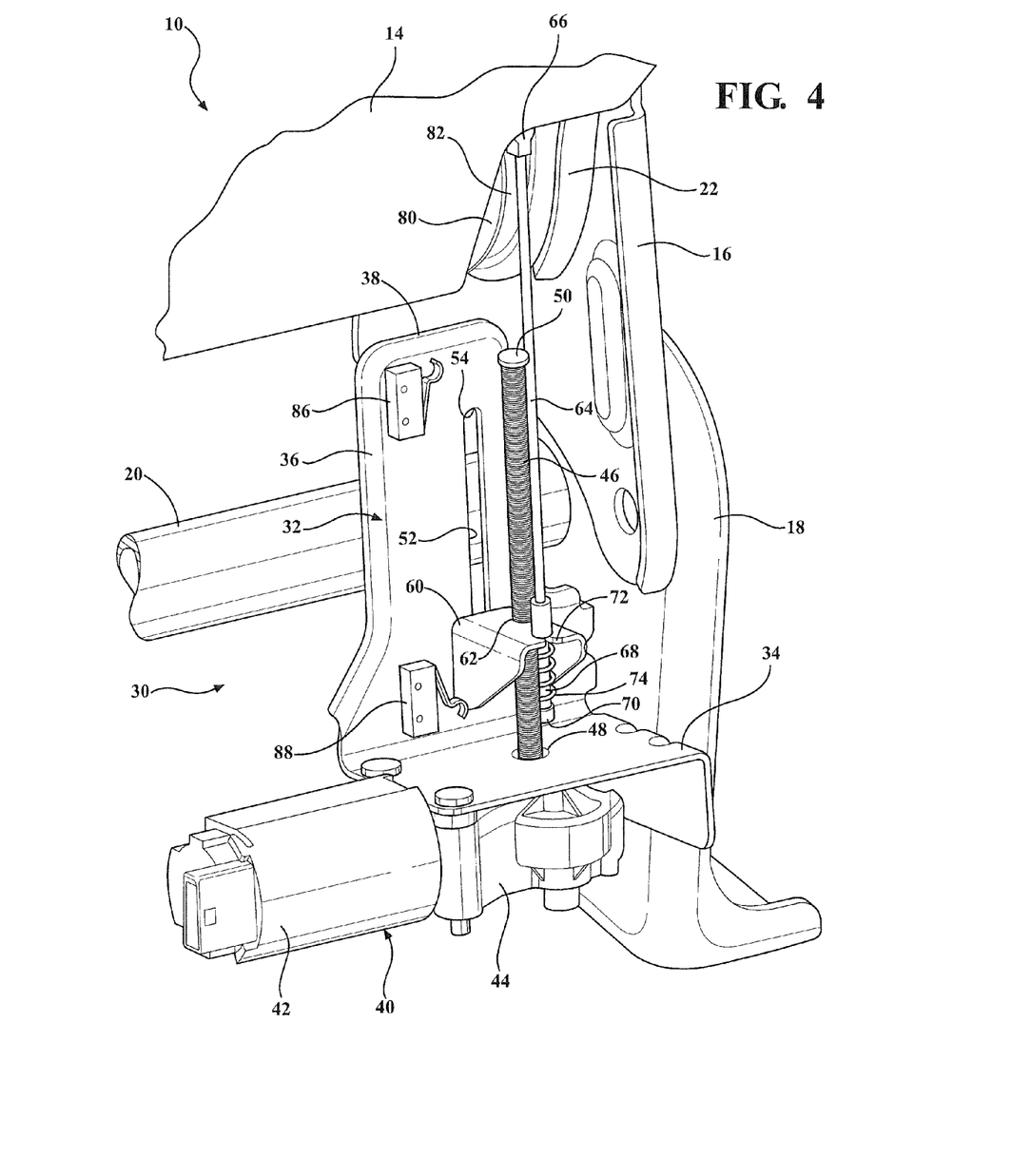
FIG. 4 is fragmentary perspective view of the seat assembly of FIG. 1 with the seat back in the seating position and the power return mechanism in a full stroke position.

The slide portion 36 of the support bracket 32 includes an elongated slot 52 extending between a first end 54 adjacent the distal end 38 and an opposite second end 56 adjacent the base portion 34 and generally parallel with and spaced from the drive screw 46. A generally U-shaped slider bracket 60 is slidably coupled to the slide portion 36 and guided by the elongated slot 52 for sliding movement therealong between the first and second ends 54, 56. The slider bracket 60 includes a threaded bore 62 for threadingly receiving the threaded drive screw 46 therethrough. The drive screw 46 drives the slider bracket 60 along the slot 52 in the slide portion 36 between the first end 54 defining a home position, as shown in FIG. 1, and the opposite second end 56 defining a full stroke position, as shown in FIG. 4.

The power return mechanism 30 also includes a cable 64 extending between a first end 66 fixedly secured to the seat back 14 adjacent the recliner assembly 22 and an opposite second end 68 defined by an enlarged head 70. The cable 64 is slidably received through a slot 72 in the slider bracket 60. A coil spring 74 is wound around the cable 64 adjacent the second end 68 and seated between the enlarged head 70 and the slider bracket 60. The seat back 14 includes a fixed pulley 80 forming a groove 82 following a curved path corresponding to the pivotal movement of the seat back 14 for receiving and supporting the cable 64 around the pulley 80 as the seat back 14 pivots between the seating position and folded position.

Finally, the power return mechanism 30 includes an upper limit switch 86 mounted to the slider portion 36 of the support bracket 32 adjacent the first end 54 of the slot 52 to define the home position of the slider bracket 60 and a lower limit switch 88 mounted to the slider portion 36 adjacent the second end 56 of the slot 52 to define the full stroke position of the slider bracket 60. The limit switches 86, 88 are electrically connected to the motor and gear assembly 40 for selectively actuating the motor 42 in response to contact by the slider bracket 60 as will be further described hereinbelow.

Figure 1:
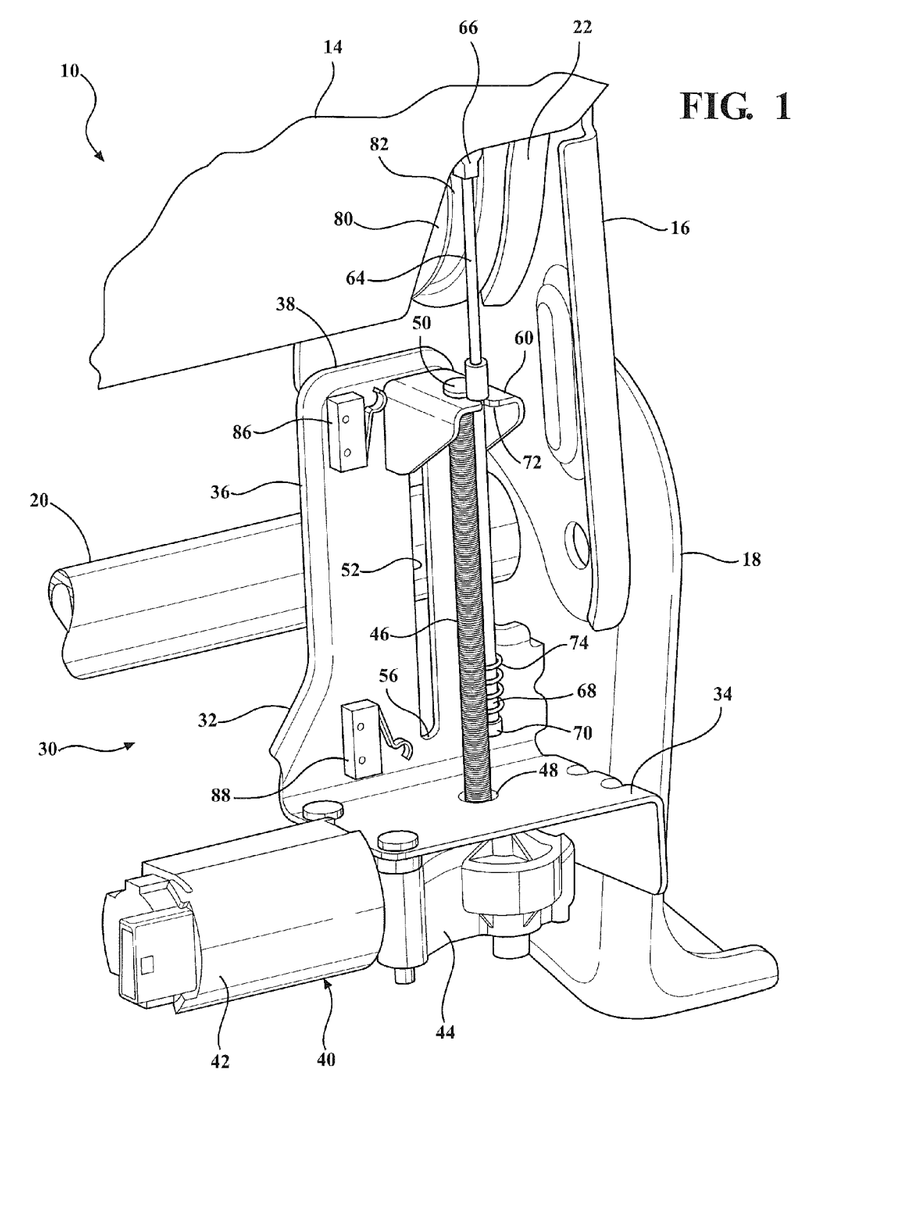
FIG. 1 is a fragmentary perspective view of a seat assembly according to a first embodiment of the invention with a seat back in a seating position and a power return mechanism in a home position.
Figure 2:
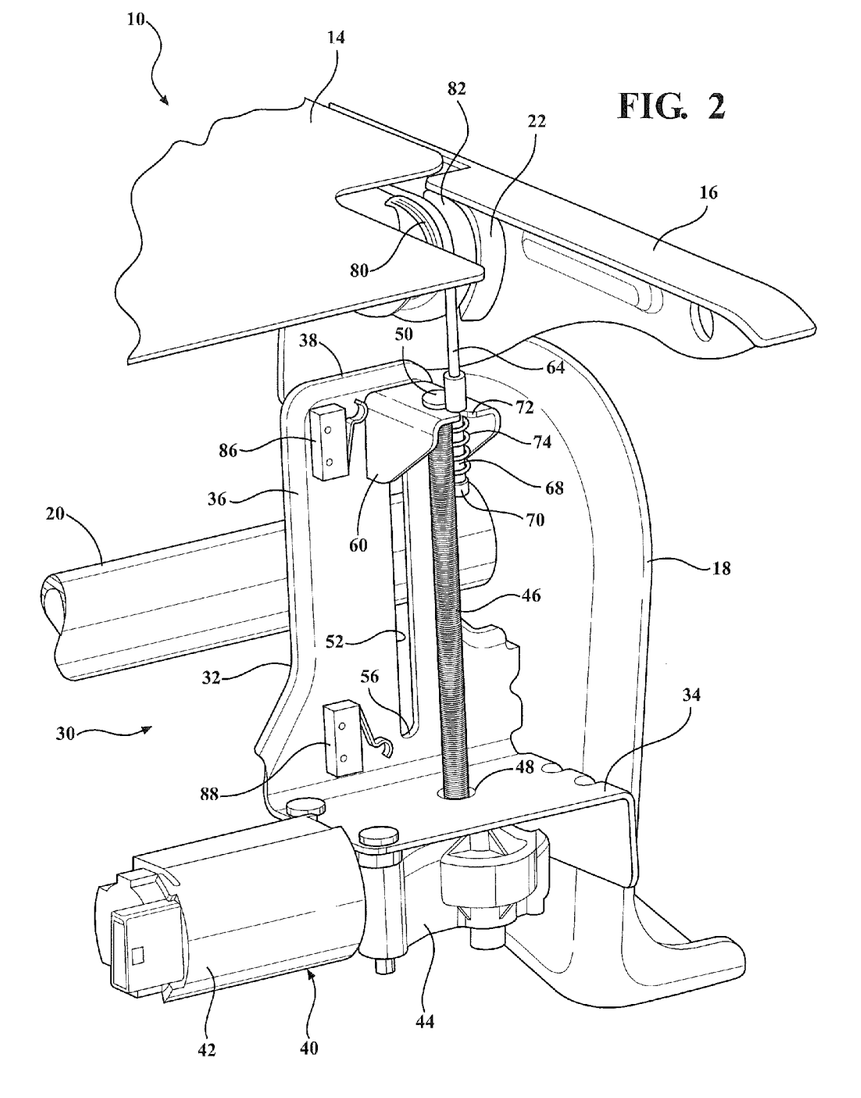
FIG. 2 is a fragmentary perspective view of the seat assembly of FIG. 1 with the seat back in a folded position and the power return mechanism is the home position.
Figure 3:
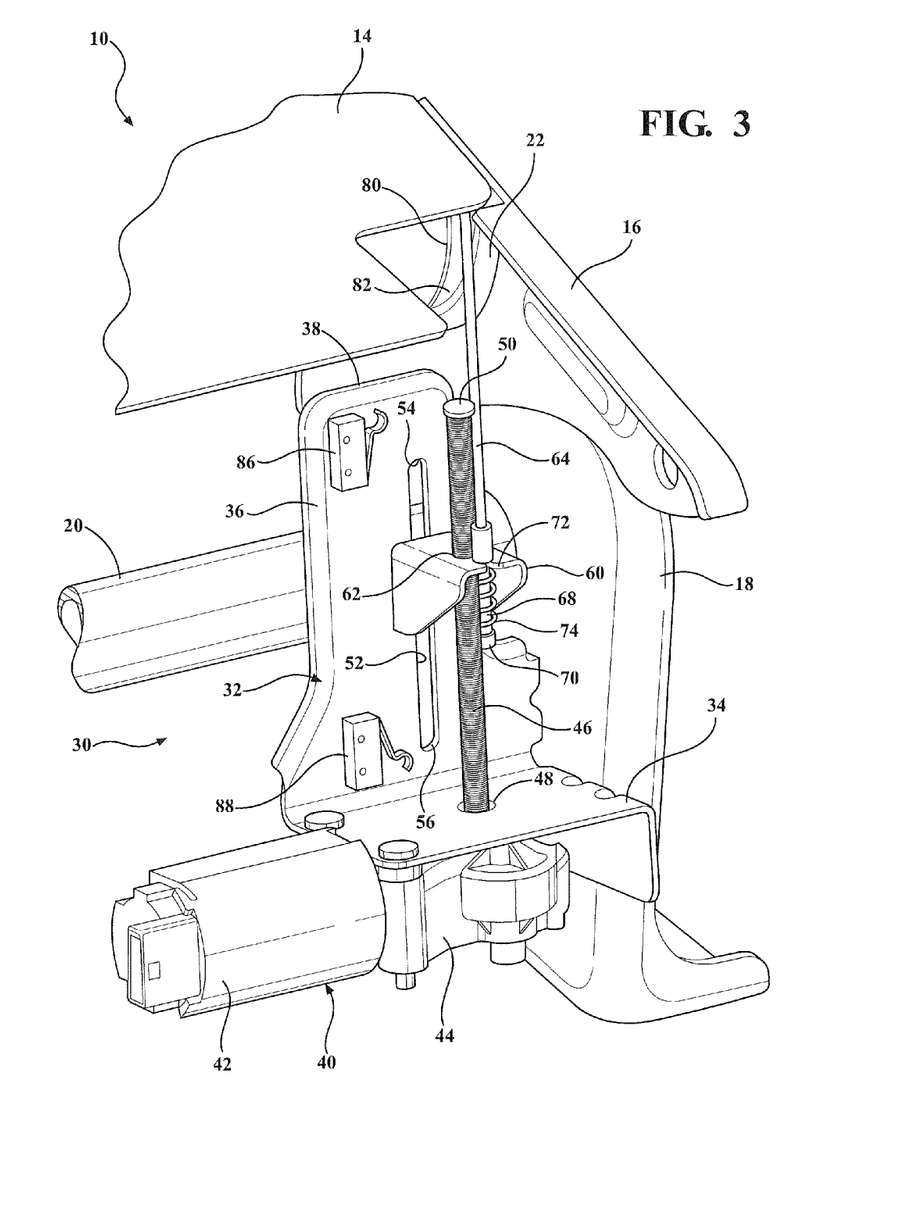
FIG. 3 is a fragmentary perspective view of the seat assembly of FIG. 1 with the power return mechanism actuated to return the seat back from the folded position to the seating position.

In operation, referring to FIG. 1, the seat assembly 10 is shown with the seat back 14 in an upright seating position and the power return mechanism 30 in the home position. The seat back 14 may be pivoted from the seating position to the folded position by unlocking the recliner assembly 22 as is commonly known in the art and pivoting the seat back 14 downwardly to the folded position overlying the seat cushion 12. As the seat back 14 is pivoted to the folded position, as shown in FIG. 2, the cable 64 is pulled and wound around the pulley 80 within the groove 82 until the enlarged head 70 is adjacent the slider bracket 60. The coil spring 74 prevents over travel of the cable 64 which may occur with varying degrees of pivotal travel of the seat back 14. In order to return the seat back 14 from the folded position to the seating position, the motor and gear assembly 40 is actuated to rotate the drive screw 46 in either the clockwise or counterclockwise direction. Rotating the drive screw 46 forces the slider bracket 60 to travel along the drive screw 46, guided by the slot 52 in the bracket 32, from the home position downwardly to the full stroke position, as shown in FIG. 3. The slider bracket 60 engages and pulls on the second end 68 of the cable 64 which in turns lifts the seat back 14 to the upright seating position, as shown in FIG. 4. Once in the seating position, the slider bracket 60 is in the full stroke position and contacts the lower limit switch 88 to reverse the direction of the drive screw in the opposite clockwise or counterclockwise direction to return the slider bracket 60 to the home position. Once the slider bracket 60 reaches the home position, it contacts the upper limit switch 88 to deactivate the motor and gear assembly 40.

Figure 5:
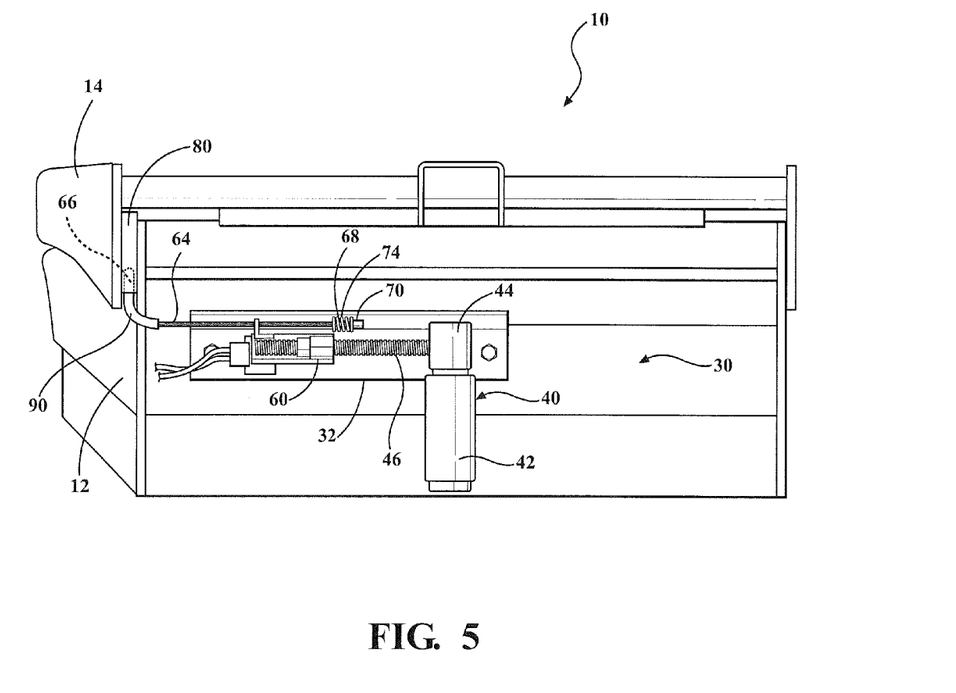
FIG. 5 is a rear view of a seat assembly according to an alternative embodiment of the invention with the seat back in the folded position and wherein the power return mechanism is mounted to the seat assembly in a horizontal orientation.
Figure 6:
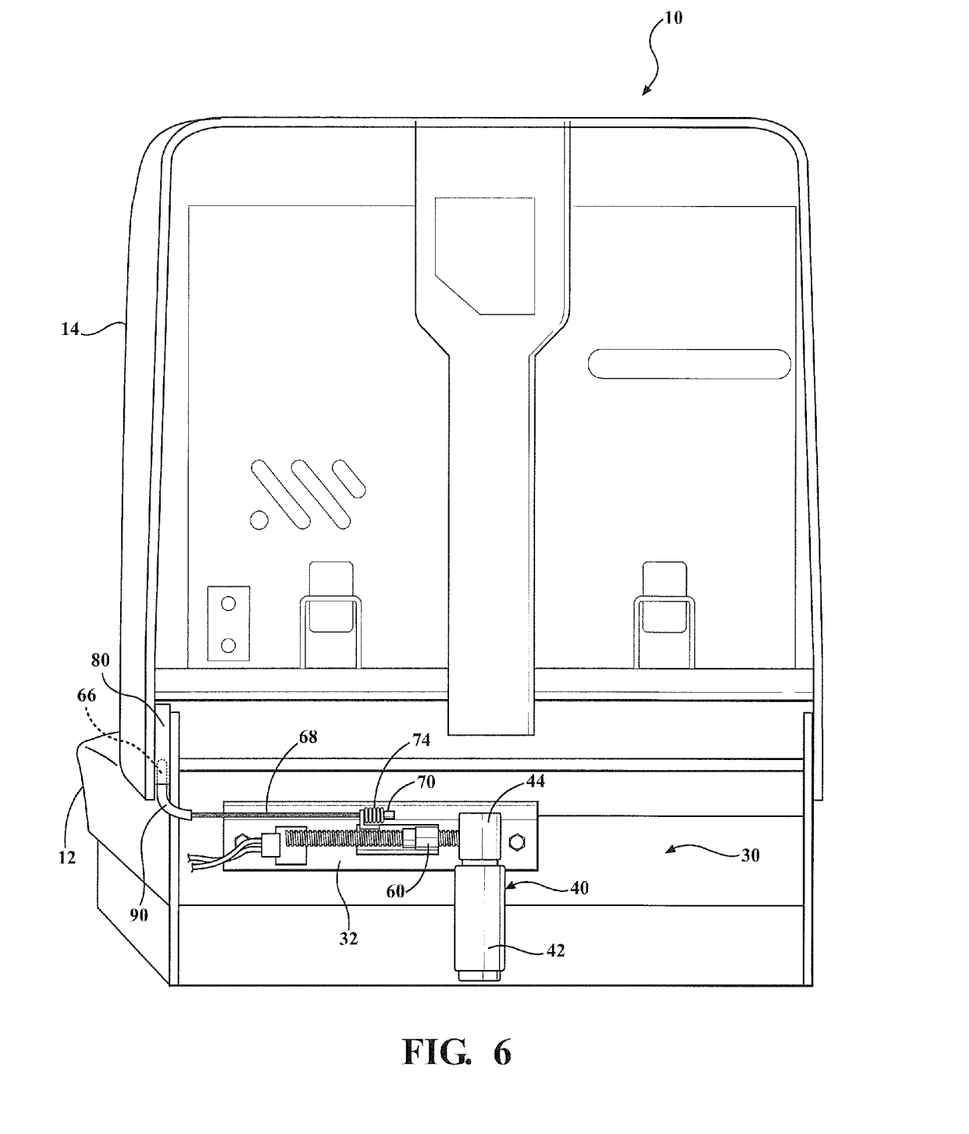
FIG. 6 is rear view of the seat assembly of FIG. 5 with the seat back returned to the seating position.

Referring to FIGS. 5 and 6, an alternative mounting arrangement of the power return mechanism 30 is shown. In the prior embodiment of FIGS. 1-4, the power return mechanism 30 is mounted to the B bracket 18 in a vertical orientation. That is, the support bracket 32 is mounted vertically between the lower base portion 34 and the top distal end of the slide portion 36. The drive screw 46 is also mounted vertically along the support bracket 32 and the slider bracket 60 travels between the upper first end 54 and the lower second end 56 of the slot 52. However, in FIGS. 5 and 6, the power return mechanism 30 is shown mounted in a horizontal orientation. FIG. 5 shows the seat assembly 10 with the seat back 14 in the folded position and the power return mechanism 30 with the support bracket 32 mounted horizontally along the cross support tube 20. FIG. 6 shows the seat assembly 10 with the seat back 14 in the seating position. A guide sheath 90 may be provided to guide the cable 64 along the required path between the slider bracket 62 and the pulley 80 on the seat back 14 when the power return mechanism 30 is mounted in the horizontal orientation. The mounting of the power return mechanism 30 in either the vertical or horizontal orientation provide flexibility for mounting and use in a variety of seat assembly 10 configurations depending on size and space for mounting and operation of the mechanism 30.

The power return mechanism 30 may also be used to power down the seat back 14 from the seating position to the folded position in addition to power return of the seat back 14 to the seating position as described above. In order to power down the seat back 14 from the seating position to the folded position, the slider bracket 60 remains engaged with the end 68 of the cable 64 as the slider bracket 60 slides or shuttles from the full stoke position to the home position via actuation of the motor and gear assembly 40 and rotation of the drive screw 46 allowing for a controlled descent of the seat back 14. That is, the seat back 14 is commonly biased towards the folded position by a clock spring mounted between the seat back 14 and the A bracket 16. Once the recliner assembly 22 is actuated to an unlocked condition, the clock spring forces the seat back 14 to pivot towards the folded position. In the power down mode, the power return mechanism 30 controls the descent of the seat back 14 by the clock spring by shuttling the slider bracket 60 from the full stroke position to the home position and remaining engaged with the cable 64 to counterbalance the bias of the clock spring and control the pivoting movement of the seat back 14. However, the recliner assembly 22 must be released or unlocked to allow the power down of the seat back 14 by the power return mechanism 30.

Figure 7A:
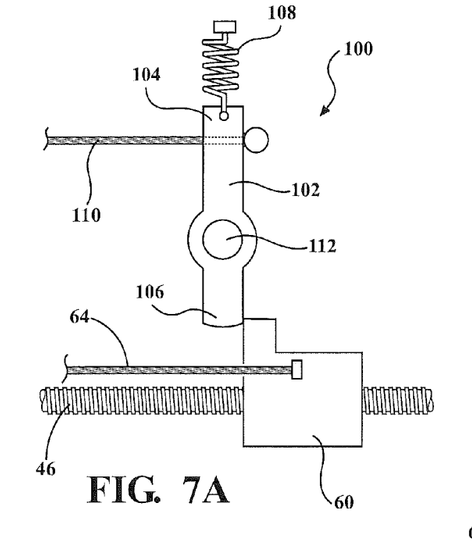
FIG. 7A is a schematic view of a release mechanism operatively coupled between a seat recliner assembly and the power return mechanism with the release mechanism in a latched position.
Figure 7B:
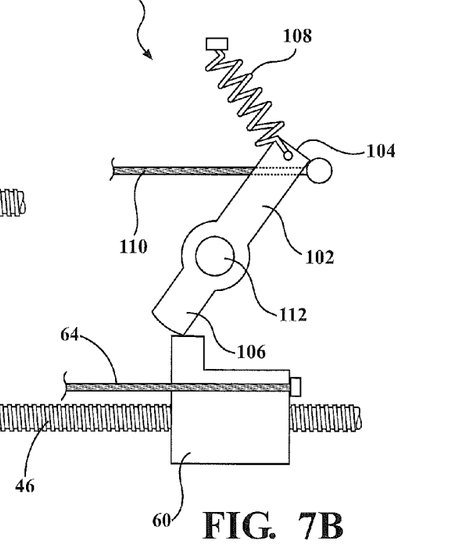
FIG. 7B is a schematic view of the release mechanism of FIG. 7A in a recliner release position.
Figure 7C:
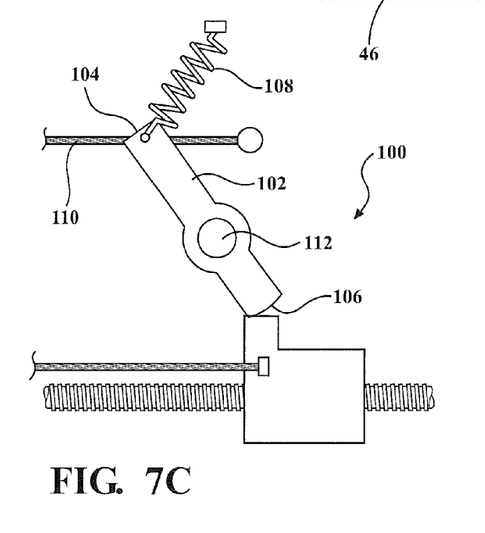
FIG. 7C is a schematic view of the release mechanism of FIG. 7A in a recliner return position.

Referring to FIGS. 7A-7C, one embodiment of a recliner release mechanism 100 is shown. The release mechanism 100 is operatively coupled between the recliner assembly 22 and the power return mechanism 30. The release mechanism 100 includes a recliner release lever 102 pivotally coupled to the seat back 14 and extending between a first end 104 and an opposite second distal end 106. A centering spring 108 extends between the seat back 14 and the first end 104 of the recliner release lever 102. A recliner release cable 110 extends between a first end slidably coupled to the recliner release lever 102 and a second end fixedly secured to the recliner assembly 22. In operation, referring to FIG. 7B, as the slider bracket 60 travels along the drive screw 46 from the full stroke position towards the home position, the slider bracket 60 engages the distal end 106 of the release lever 102 pivoting the release lever 102 about the pivot 112 in the clockwise direction and pulling on the recliner release cable 110 to actuate the recliner assembly 22 to the unlocked condition. The slider bracket 60 continues along the drive screw 46 to the home position maintaining tension on the cable 64 and controlling the descent of the seat back 14 to the folded position. Once the slider bracket 60 passes by the release lever 102, the centering spring 108 will bias and return the release lever 102 to its initial or neutral position as shown in FIG. 7A. Referring to FIG. 7C, during power return, as the slider bracket 60 travels along the drive screw 46 from the home position to the full stroke position, the slider bracket 60 again engages the distal end 106 of the release lever 102 pivoting the release lever 102 about the pivot 112 in the counterclockwise direction. However, the recliner release cable 110 simply slides relative to the release lever 102 creating slack so as to not further actuate the recliner assembly 22 to the locked condition. The slider bracket 60 continues along the drive screw 46 pulling on the cable 64 and returning the seat back 14 to the seating position as the power return mechanism 30 moves to the full stroke position.

Figure 8A:
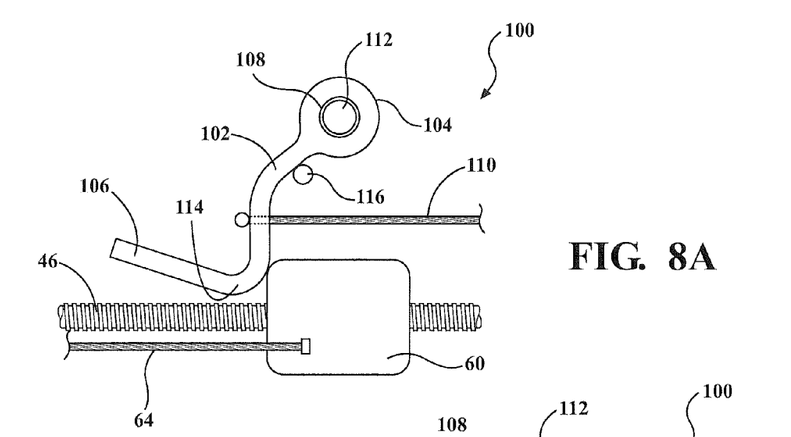
FIG. 8A is a schematic view of a release mechanism operatively coupled between a seat recliner assembly and the power return mechanism according to an alternative embodiment and in a latched position.
Figure 8B:
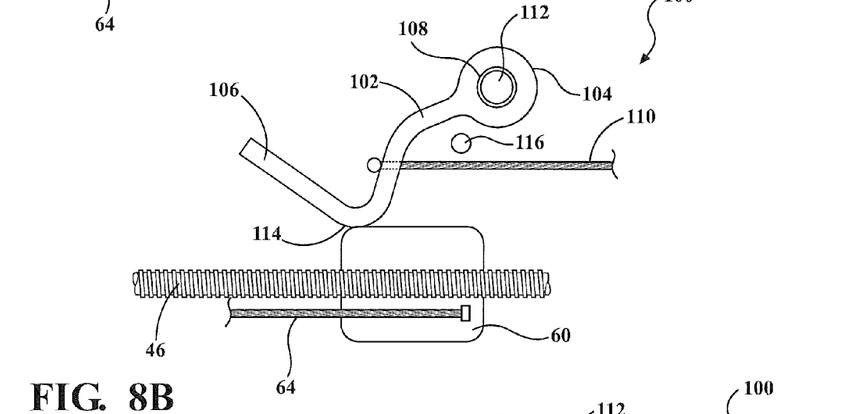
FIG. 8B is a schematic view of the release mechanism of FIG. 8A in a recliner release position.
Figure 8C:
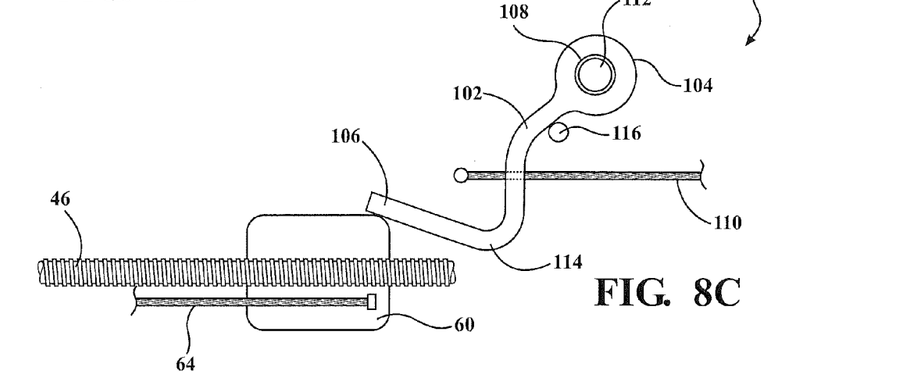
FIG. 8C is a schematic view of the release mechanism of FIG. 8C in a recliner return position.

Referring to FIGS. 8A-8C, an alternative embodiment of a recliner release mechanism 100 is shown. The release mechanism 100 is operatively coupled between the recliner assembly 22 and the power return mechanism 30. The release mechanism 100 includes a generally L-shaped recliner release lever 102 extending between a first end 104 pivotally coupled to the seat back 14 by a pivot 112 and an opposite second distal end 106 forming a cam lobe 114. A torsion spring 108 extends between the seat back 14 and the first end 104 of the recliner release lever 102 to bias the release lever 102 in the counterclockwise direction against a stopper 116. A recliner release cable 110 extends between a first end slidably coupled to the recliner release lever 102 and a second end fixedly secured to the recliner assembly 22. In operation, referring to FIG. 8B, as the slider bracket 60 travels along the drive screw 46 from the full stroke position towards the home position, the slider bracket 60 engages the cam lobe 114 of the release lever 102 pivoting the release lever 102 about the pivot 112 in the clockwise direction and pulling on the recliner release cable 110 to actuate the recliner assembly 22 to the unlocked condition. The slider bracket 60 continues along the drive screw 46 to the home position maintaining tension on the cable 64 and controlling the descent of the seat back 14 to the folded position. Once the slider bracket 60 passes by the release lever 102, the torsion spring 108 will bias and return the release lever 102 to its initial or neutral position against the stopper 116 as shown in FIG. 8C. During power return, as the slider bracket 60 travels along the drive screw 46 from the home position to the full stroke position, the slider bracket 60 again engages the cam lobe 114 of the release lever 102 pivoting the release lever 102 about the pivot 112 in the counterclockwise direction. However, the recliner release cable 110 simply slides relative to the release lever 102 creating slack so as to not further actuate the recliner assembly 22 to the locked condition. The slider bracket 60 continues along the drive screw 46 pulling on the cable 64 and returning the seat back 14 to the seating position as the power return mechanism 30 moves to the full stroke position.

The invention has been described herein in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat assembly for use in an automotive vehicle comprising:
    a seat cushion;
    a seat back pivotally coupled to said seat cushion for pivotal movement between a generally upright seating position and a folded position overlying said seat cushion; and
    a power return mechanism operatively coupled to said seat back for automatically returning said seat back from said folded position to said seating position, said power return mechanism including a support bracket for mounting said power return mechanism to said seat assembly, a slider bracket slidably coupled to said support bracket, a cable having a first end connected to said seat back and an opposite second end connected to said slider bracket, and a motor and gear assembly for power driving said slider bracket between a home position when said seat back is in said seating position and a full stroke position pulling said cable to pivot said seat back from said folded position to said seating position.

2. A seat assembly as set forth in claim 1 further including a recliner assembly operatively coupled to said seat back for providing selective pivotal movement of said seat back between said seating and folded positions.

3. A seat assembly as set forth in claim 2 wherein said power return mechanism includes a drive screw rotatably coupled between said motor and gear assembly and said slider bracket for driving said slider bracket between said home and full stroke positions in response to rotation of said drive screw.

4. A seat assembly as set forth in claim 3 wherein said motor and gear assembly includes an electric motor operatively coupled to a gear train and wherein said drive screw is connected to said gear train for rotation in opposing first and second directions in response to power actuation of said motor.

5. A seat assembly as set forth in claim 4 wherein said support bracket includes a base portion for mounting said power return mechanism to said seat assembly and a slide portion extending from said base portion for slidably supporting said slider bracket between said home and full stroke positions.

6. A seat assembly as set forth in claim 5 wherein said slide portion of said support bracket includes an elongated slot therein extending longitudinally and generally parallel to said drive screw for slidably supporting and guiding said slider bracket between said home and full stroke positions.

7. A seat assembly as set forth in claim 6 wherein said slider bracket includes a threaded bore for threadingly receiving said drive screw therethrough wherein rotation of said drive screw in said opposing first and said directions shuttles said slider bracket along said slot between said home and full stroke positions.

8. A seat assembly as set forth in claim 7 wherein said first end of said cable is fixedly secured to said seat back and said second end of said cable is slidably coupled to said slider bracket.

9. A seat assembly as set forth in claim 8 wherein said cable includes an enlarged head fixed on said second end thereof for cooperating with said slider bracket during movement from said home position to said full stroke position to pull said cable and return said seat back to said seating position.

10. A seat assembly as set forth in claim 9 wherein said cable includes a coil spring wrapped around said cable and seated between said enlarged head and said slider bracket for preventing over travel of said cable when said seat back is pivoted to said folded position.

11. A seat assembly as set forth in claim 10 further including a pulley coupled to said seat back adjacent said recliner assembly forming a groove for receiving and guiding said cable along an arcuate path as said seat back pivots between said seating position and said folded position.

12. A seat assembly as set forth in claim 11 wherein said elongated slot extends longitudinally between opposite first and second ends and said seat assembly further includes an upper limit switch mounted to said slide portion of said support bracket for contacting said slider bracket and defining said home position when said slider bracket is shuttled to said first end of said elongated slot.

13. A seat assembly as set forth in claim 12 further including a lower limit switch mounted to said slide portion of said support bracket for contacting said slider bracket and defining said full stroke position when said slider bracket is shuttled to said second end of said elongated slot.

14. A seat assembly as set forth in claim 13 further including a release mechanism operatively coupled between said recliner assembly and said power return mechanism for actuating said recliner assembly to an unlocked condition in response to actuation of said slider bracket from said full stroke position to said home position whereby said power return mechanism controls the descent of said seat back from said seating position to said folded position.

15. A seat assembly as set forth in claim 14 wherein said release mechanism includes a recliner release lever pivotally coupled to said seat assembly and having a distal end for engagement by said slider bracket during shuttling of said slider bracket between said home and full stroke positions.

16. A seat assembly as set forth in claim 15 wherein said release mechanism includes a recliner release cable operatively coupled between said recliner assembly and said recliner release lever for actuation of said recliner assembly to said unlocked condition in response to pivotal movement of said recliner release lever in a first direction by said slider bracket shuttling from said full stroke position to said home position.

17. A seat assembly as set forth in claim 16 wherein said release mechanism includes a spring coupled to said recliner release lever for biasing said recliner release lever to a neutral position maintaining said recliner assembly in a locked condition.

* * * * *